United States Patent
Yu

(10) Patent No.: US 8,424,432 B2
(45) Date of Patent: Apr. 23, 2013

(54) WASTE ROLL WEB PRODUCT PROCESSING SYSTEM

(75) Inventor: Chi-Hsing Yu, Taoyuan (TW)

(73) Assignee: Chan Li Machinery Co., Ltd., Taoyuan (TW)

( * ) Notice: Subject to any disclaimer, the term of this patent is extended or adjusted under 35 U.S.C. 154(b) by 333 days.

(21) Appl. No.: 12/833,693

(22) Filed: Jul. 9, 2010

(65) Prior Publication Data

US 2011/0185870 A1    Aug. 4, 2011

(30) Foreign Application Priority Data

Jan. 29, 2010   (TW) ............................... 99102545 A

(51) Int. Cl.
*B26D 3/28*   (2006.01)
(52) U.S. Cl.
USPC ............................... 83/423; 83/435.2; 83/924
(58) Field of Classification Search .................... 83/924, 83/423, 54, 435, 435.2
See application file for complete search history.

(56) References Cited

U.S. PATENT DOCUMENTS

| | | | | |
|---|---|---|---|---|
| 4,046,042 | A * | 9/1977 | Payeur | 83/418 |
| 5,031,496 | A * | 7/1991 | Lobash et al. | 83/107 |
| 7,677,147 | B2 * | 3/2010 | Gambini | 83/102 |
| 7,913,597 | B2 * | 3/2011 | Gambini | 83/102 |
| 8,117,733 | B2 * | 2/2012 | Reggiani et al. | 29/564.3 |
| 2002/0166431 | A1 * | 11/2002 | Benjamin et al. | 83/423 |
| 2007/0022854 | A1 | 2/2007 | Gambini | |
| 2010/0186561 | A1 * | 7/2010 | Brighella et al. | 83/13 |

FOREIGN PATENT DOCUMENTS

| | | |
|---|---|---|
| EP | 1582492 A1 | 10/2005 |
| EP | 1724076 A1 | 11/2006 |
| JP | 8-131989 A | 5/1996 |
| JP | 2001-063921 A | 3/2001 |
| JP | 2001-171911 A | 6/2001 |
| JP | 2008-247515 A | 10/2008 |
| WO | 2007/034528 A1 | 3/2007 |

* cited by examiner

*Primary Examiner* — Kenneth E. Peterson
(74) *Attorney, Agent, or Firm* — Rosenberg, Klein & Lee

(57) ABSTRACT

A waste roll web product processing system includes a first roller conveyor, a push bar conveyor, a second roller conveyor, a guide device and a cutter. The push bar conveyor pushes waste roll web products from the first roller conveyor to the second roller conveyor for enabling the second roller conveyor to deliver the waste roll web products to the guide device so that the waste roll web products fall downwards along the guide device one after another and the cutter cuts off each falling waste roll web product for enabling the web material and shaft of each waste roll web product to be separately recycled.

17 Claims, 7 Drawing Sheets

WASTE ROLL WEB PRODUCT PROCESSING SYSTEM

FIELD OF THE INVENTION

The present invention relates to waste material processing equipment and more particularly, to a waste roll web product processing system, which automatically separates the waste web material and shaft of a roll web product for recycling and remanufacturing.

BACKGROUND OF THE INVENTION

FIG. 1 illustrates a conventional waste roll web product processing apparatus. As illustrated, the waste roll web product processing apparatus 10 comprises a guide tube 11 and a circular cutter 13. The circular cutter 13 is set at one lateral side of the guide tube 11 and rotated to cut off the waste web material to be processed.

During fabrication of a roll web product, a roll of web material 2 is made and then properly cut into a roll web product 20 subject to a predetermined size. The roll of web material 2 comprises a shaft 21, and a web material 22 (crepe paper, tissue paper, web, etc.) rolled up on the shaft 21.

When cutting the roll of web material 2 into a roll web product 20, a waste head material 23 and a waste end material 25 will be produced. The length of the waste head material 23 and the length of the waste end material 25 are shorter than the length of the roll web product 20, not useful for sale, as shown in FIG. 2.

For the sake of material cost down and environmental protection, a roll web product manufacturer usually uses a waste roll web product processing apparatus 10 to recycle the waste head material 23 and the waste end material 25 that are cut from a roll of web material 2. In actual application, the user can attach the waste head material 23 and/or the waste end material 25 to the guide tube 11 of the waste roll web product processing apparatus 10 manually. However, because the guide tube 11 is vertically supported on the floor, the waste head material 23 and/or the waste end material 25 will drop along the guide tube 11 subject to the effect of gravity. When falling downwards, the waste head material 23 and/or the waste end material 25 will touch the cutting edge of the circular cutter 13, and therefore the circular cutter 13 cuts off the waste head material 23 and/or the waste end material 25.

Because the web material 22 is rolled up on the shaft 21, the web material 22 will be cut off and separated from the shaft 21 for recycling when the waste head material 23 and/or the waste end material 25 pass through the cutting edge of the circular cutter 13.

The aforesaid prior art waste roll web product processing apparatus 10 can separate the web material 22 from the shaft 21. However, it is necessary to put the waste head material 23 and/or the waste end material 25 onto the guide tube 11 of the waste roll web product processing apparatus 10 manually during the waste processing process. This waste processing process has low efficiency. Further, the operator may touch the circular cutter 13 accidentally when putting the waste head material 23 and/or the waste end material 25 onto the guide tube 11, resulting in an injury.

SUMMARY OF THE PRESENT INVENTION

It is, therefore, the main object of the present invention to provide a waste roll web product processing system, which automatically separates the web material of shaft of each waste roll web product for recycling, improving waste recycling efficiency and reducing the danger.

It is another object of the present invention to provide a waste roll web product processing system, which uses a push bar conveyor to push waste roll web products stably from a first roller conveyor to a second roller conveyor so that waste roll web products can be delivered stably in different directions.

It is still another object of the present invention to provide a waste roll web product processing system, which uses a guide device at one side of the second roller conveyor for guiding waste roll web products one after another in a predetermined direction for cutting by a cutter.

It is still another object of the present invention to provide a waste roll web product processing system, which uses a goose head shape conveyor to feed waste roll web products to the first roller conveyor and a screening device to screen waste roll web products for conveying to the first roller conveyor so that the waste roll web products that are fed to the first roller conveyor are arranged in good order.

It is still another object of the present invention to provide a waste roll web product processing system, which uses a circular cutter for cutting off each waste roll web product being delivered to the guide device, and cutter grinders for grinding the circular cutter during rotation of the circular cutter to cut off waste roll web products.

To achieve these and other objects of the present invention, a waste roll web product processing system is adapted for processing waste roll web products for recycling. The waste roll web product processing system comprises a first roller conveyor adapted for conveying the waste roll web products, a push bar conveyor arranged around the first roller conveyor and adapted for receiving the waste roll web products from the first roller conveyor and pushing the waste roll web products forward, a second roller conveyor adapted for receiving the waste roll web products from the push bar conveyor and conveying the waste roll web products forward, a guide device disposed at one lateral side relative to the second roller conveyor and adapted for receiving the waste roll web products from the second roller conveyor and guiding the waste roll web products in a predetermined direction, and a cutter set at one lateral side relative to the guide device and adapted for cutting off the waste roll web products.

DETAILED DESCRIPTION OF THE PREFERRED EMBODIMENTS

Figure 3:
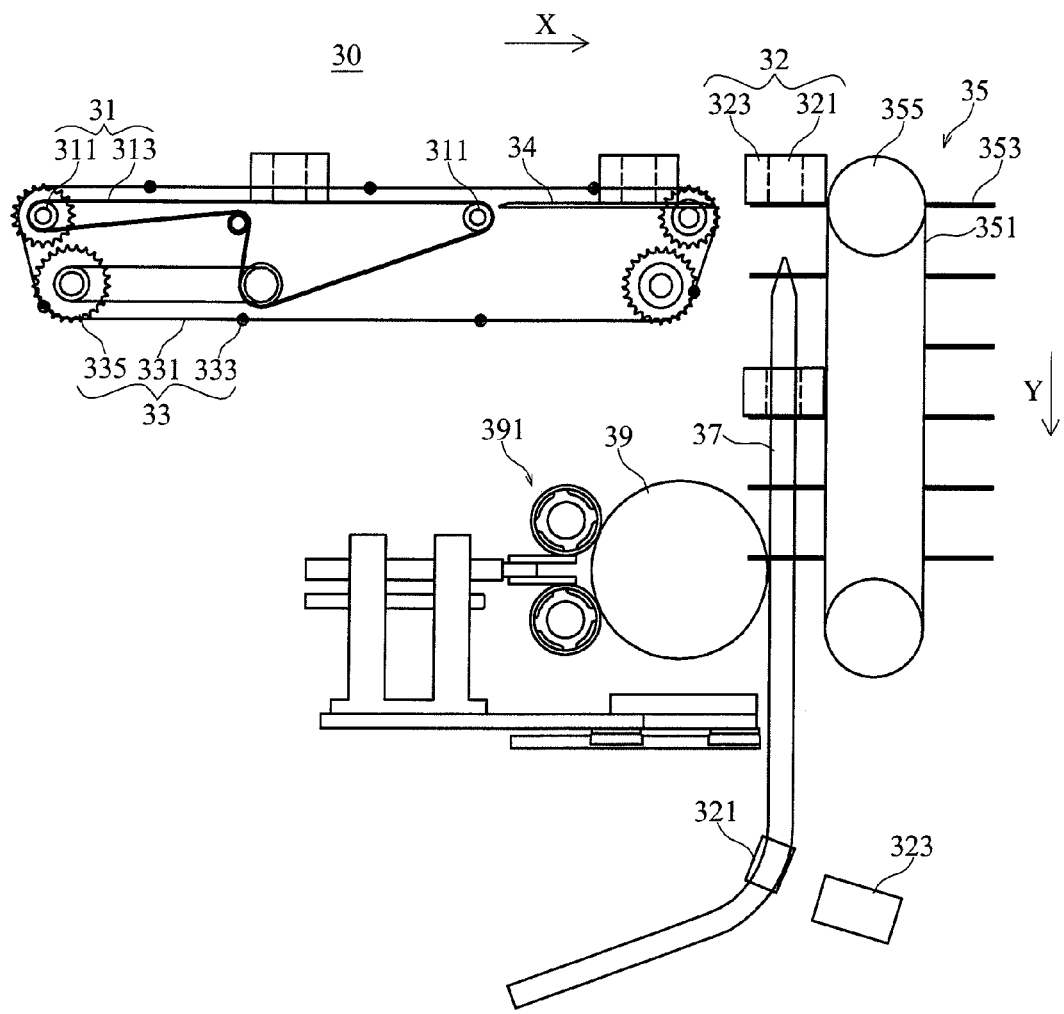
FIG. 3 is a schematic structural view of a waste roll web product processing system in accordance with a first embodiment of the present invention.
Figure 3:
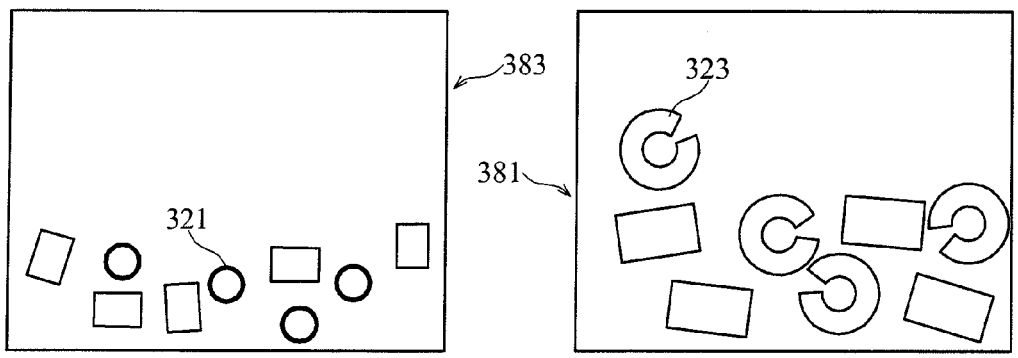

Please refer to FIG. 3. A waste roll web product processing system 30 in accordance with a first embodiment of the present invention is shown comprising a first roller conveyer 31, a push bar conveyor 33, a second roller conveyer 35, a guide device 37 and a cutter 39. By means of the use of the waste roll web product processing system 30, waste roll web products 32 are separated into different groups and separately recycled, improving recycling efficiency and safety.

Figure 1:
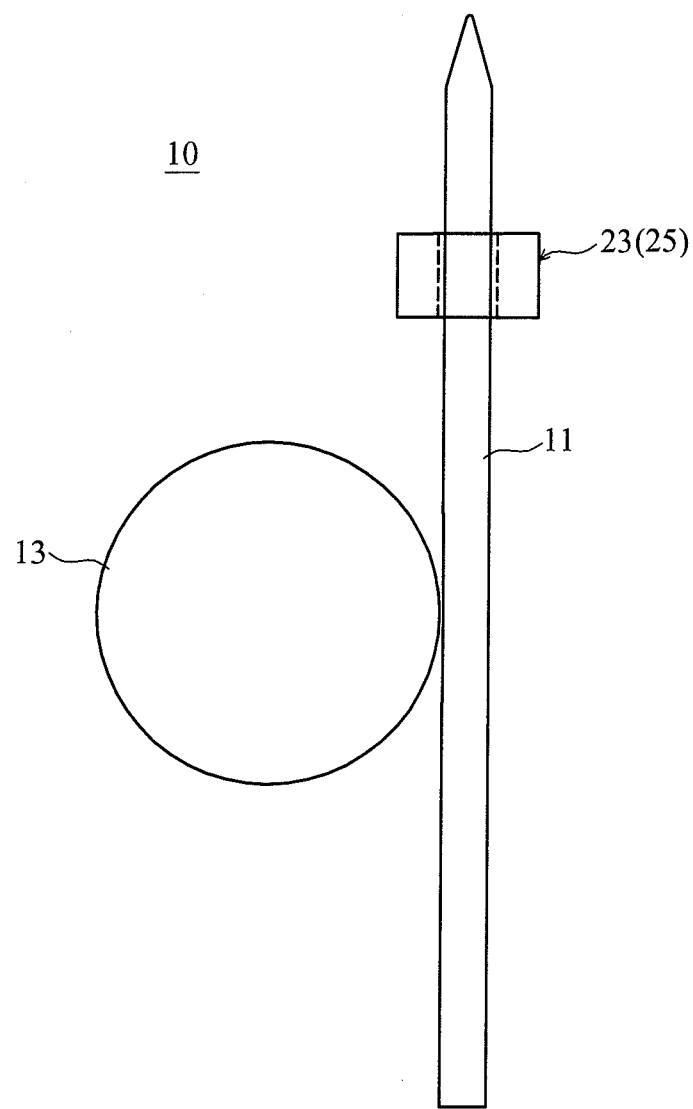
FIG. 1 is a schematic structural view of a waste roll web product processing apparatus according to the prior art.
Figure 2:
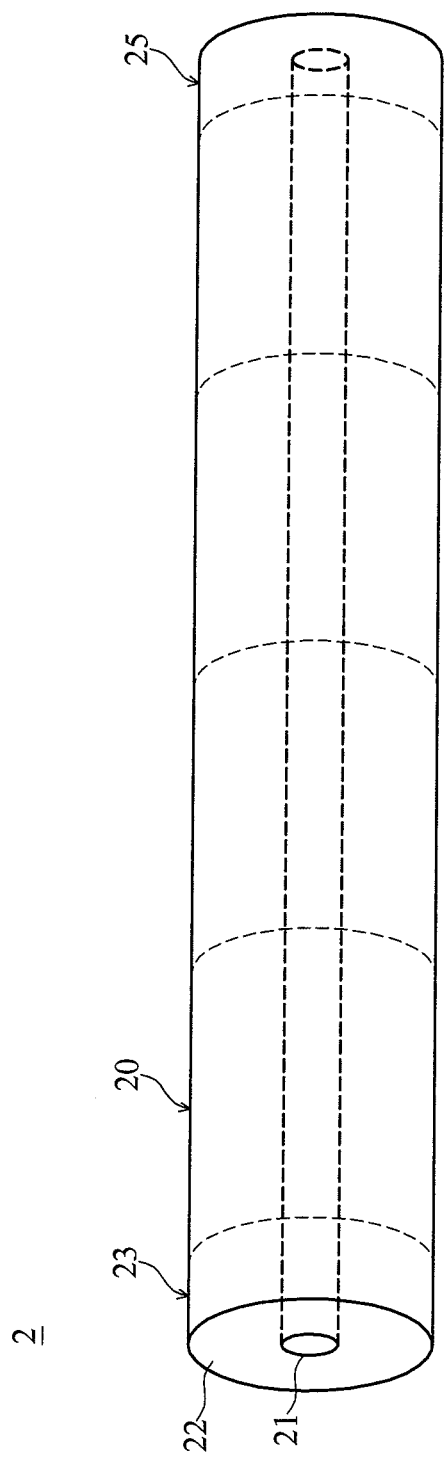
FIG. 2 is a schematic structural view of a roll web product.

As illustrated in FIG. 2, a waste head material 23 and/or a waste end material 25 will be produced when a roll web product 20 is made. Because the length of the waste head material 23 and the length of the waste end material 25 are shorter than the length of the roll web product 20, the waste head material 23 and the waste end material 25 are not useful for sale. For the sake of material cost down and environmental protection, the manufacturer will recycle the waste head material 23 and the waste end material 25.

The first roller conveyor 31 is adapted for delivering waste roll web products 32 that can be waste head materials 23 and/or waste end materials 25 cut from rolls of web material during fabrication of roll web products. According to this first embodiment, the first roller conveyor 31 comprises a plurality of rollers 311 and at least one conveyor belt 313. The conveyor belt 313 is wound around the rollers 311. When rotating the rollers 311, the conveyor belt 313 is moved to carry the waste roll web products 32 (waste head materials 23 and/or waste end materials 25) forwards.

The push bar conveyor 33 is mounted around the first roller conveyor 31, and adapted for receiving waste roll web products 32 from the first roller conveyor 31 and delivering the received waste roll web products 32 by pushing. According to this first embodiment, the push bar conveyor 33 comprises a plurality of chain wheels 335, at least one chain 331 mounted around the chain wheels 335, and at least one push bar 333 fastened to the at least one chain 331. When rotating the chain wheels 335, the at least one push bar 33 is moved with the at least one chain 331 to push the waste roll web products 32 forwards.

Figure 3A:
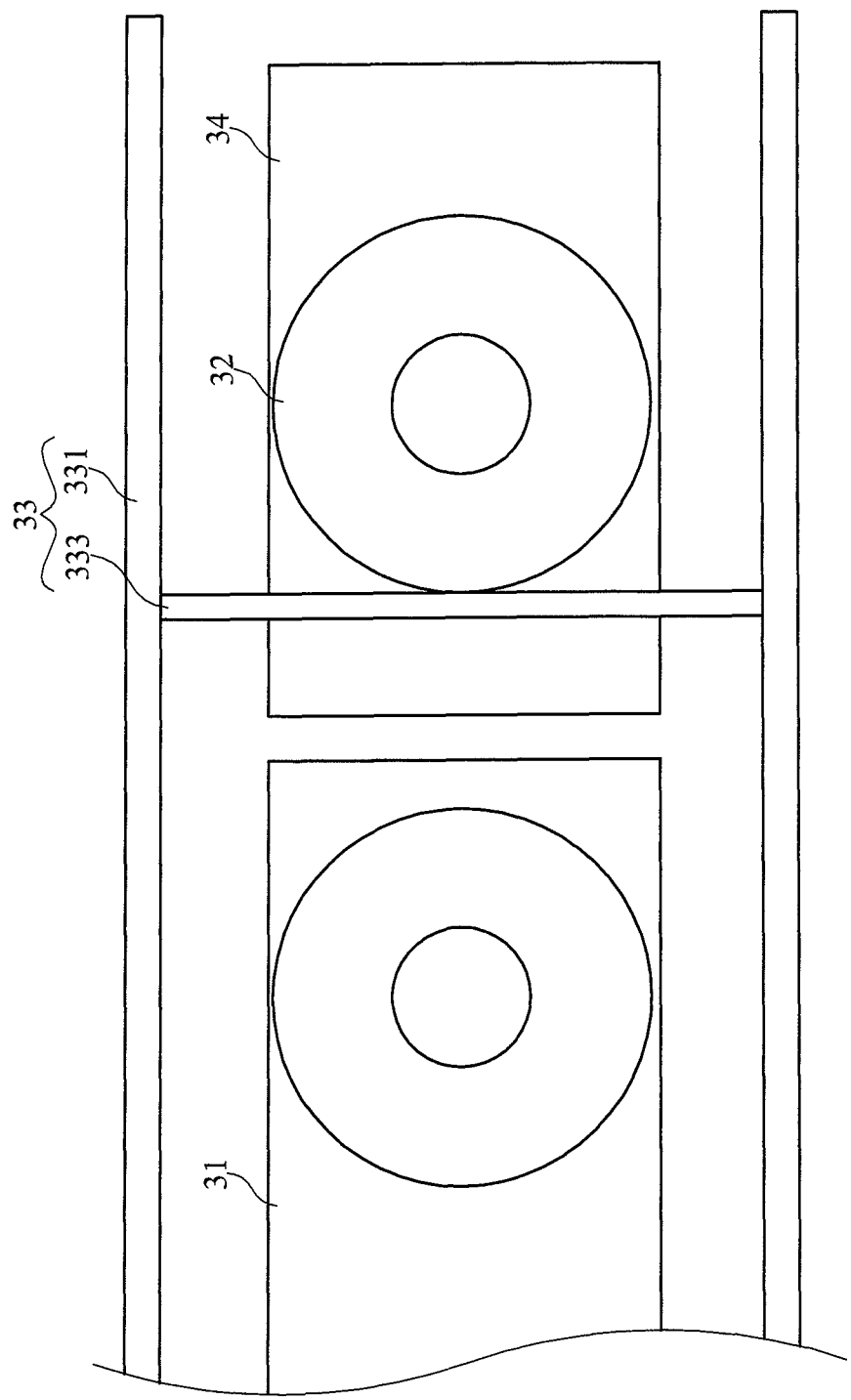
FIG. 3A is a schematic top view in an enlarged scale of the waste roll web product processing system in accordance with the first embodiment of the present invention.

The waste roll web product processing system 30 further comprises a conveying platform 34 connected to the first roller conveyor 31 and adapted for receiving the waste roll web products 32 from the first roller conveyor 31, for enabling the received waste roll web products 32 to be pushed forwards by the push bar conveyor 33, as shown in FIG. 3A.

The second roller conveyer 35 is provided at one lateral side relative to the push bar conveyor 33, and adapted to receive the waste roll web products 32 that are pushed by the at least one push bar 333 of the push bar conveyor 33. By means of using the at least one push bar 333 to push the waste roll web products 32, the waste roll web products 32 are smoothly delivered to the second roller conveyer 35.

The second roller conveyer 35 comprises a plurality of rollers 355, at least one conveyor belt 351 mounted around the rollers 355 and at least one carrier 353 mounted on the at least one conveyor belt 351. During operation of the waste roll web product processing system 30, the push bar conveyor 33 pushes the waste roll web products 32 to the at least one carrier 353, for enabling the at least one carrier 353 to carry received waste roll web products 32. When rotating the rollers 355, the at least one carrier 353 is moved with the at least one conveyor belt 351 to deliver the loaded waste roll web products 32.

According to this first embodiment, the first roller conveyer 31 and the push bar conveyor 33 are adapted to deliver the waste roll web products 32 in a first direction X; the second roller conveyer 35 is a vertical conveyor, and adapted to deliver the waste roll web products 32 in a second direction Y perpendicular to the first direction X. The first direction X can be the horizontal direction, and the second direction Y can be the vertical direction.

The guide device 37 is provided at one lateral side relative to the second roller conveyer 35, and adapted to receive the waste roll web products 32 from the second roller conveyer 35. The guide device 37 is insertable through the at least one carrier 353 so that the waste roll web products 32 moved away from the second roller conveyer 35 and sleeved onto the guide device 37. According to this first embodiment, the guide device 37 is set in vertical so that the waste roll web products 32 fall vertically downwards subject to the effect of gravity when they are sleeved onto the guide device 37.

The cutter 39 is set at one lateral side relative to the guide device 37 so that when the waste roll web products 32 fall vertically downwards, they will touch the cutting edge of the cutter 39, and the cutter 39 will cut off the waste roll web products 32. The waste roll web products 32 each comprise a shaft 321 and a web material 323 rolled up on the shaft 321. When one waste roll web product 32 is moved over the cutter 39, the cutter 39 cuts off the web material 323, separating the web material 323 from the shaft 321.

The waste roll web product processing system 30 further comprises a first recycling bin 381 and a second recycling bin 383. The first recycling bin 381 and the second recycling bin 383 are set below the guide device 37 so that the web material 323 and shaft 321 of each waste roll web product 32 can be respectively collected in the first recycling bin 381 and the second recycling bin 383, finishing the classified recycling operation. The guide device 37 can be a rod member having a bottom end thereof smoothly curved in a direction toward the second recycling bin 383. Thus, when one waste roll web product 32 passed over the cutter 39, the web material 323 will be separated from the shaft 321 and fall downwards to the first recycling bin 381, and the shaft 321 will be guided by the guide device 37 to the inside of the second recycling bin 383.

Further, the cutter 39 can be a circular cutter rotatably to cut off the web material 323 of each waste roll web product 32. Further, cutter grinders 391 may be provided at one lateral side relative to the cutter 39 and movable into contact with the circular cutter 39. Thus, the cutter grinders 391 grind the cutting edge of the circular cutter 39 as the circular cutter 39 is rotating, thereby sharpening the cutting edge of the circular cutter 39.

Figure 4:
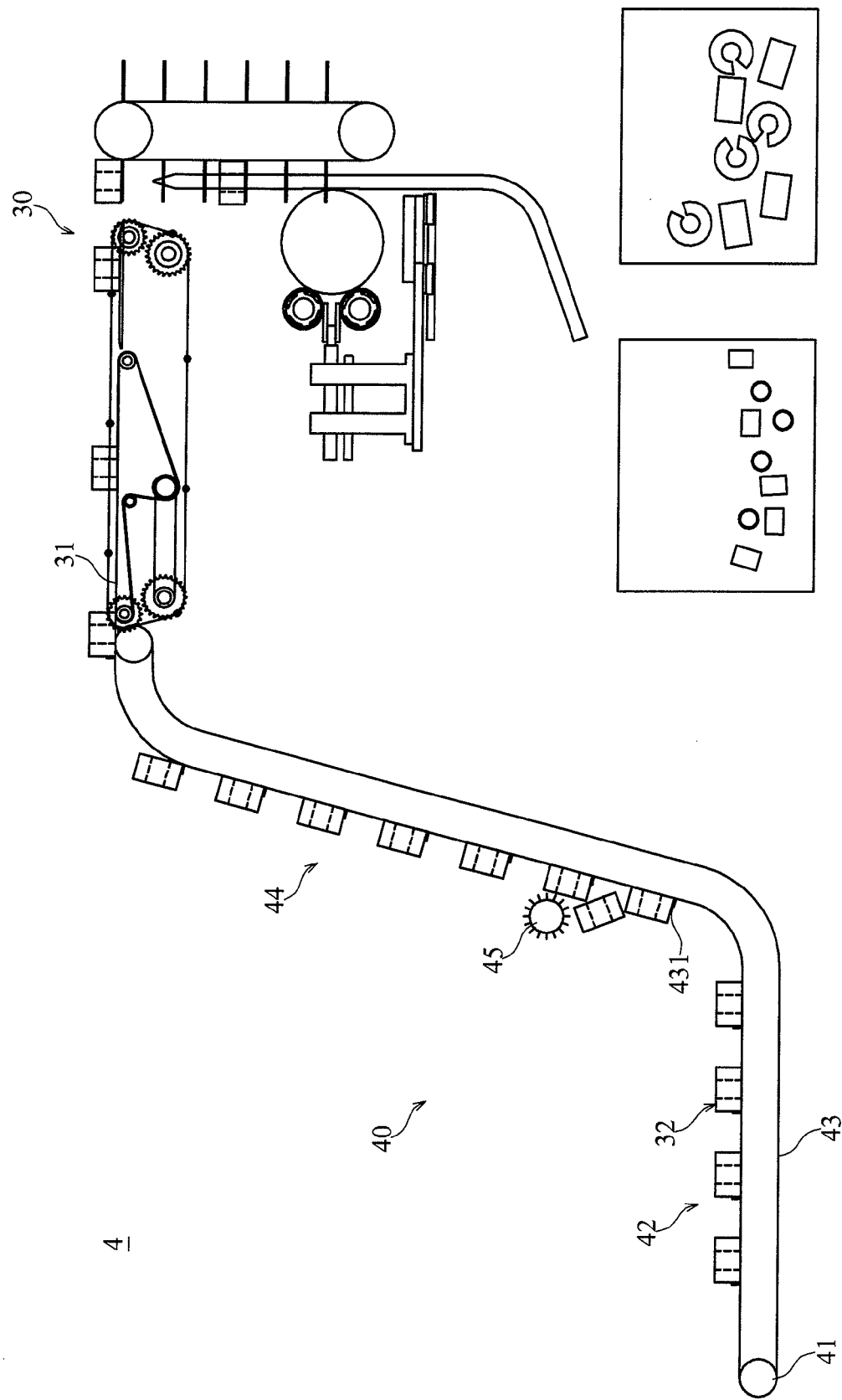
FIG. 4 is a schematic structural view of a waste roll web product processing system in accordance with a second embodiment of the present invention.

FIG. 4 illustrates a waste roll web product processing system in accordance with a second embodiment of the present invention. According to this second embodiment, the waste roll web product processing system 4 is a combination of the waste roll web product processing system 30 constructed in accordance with the first embodiment of the present invention and a goose head shape conveyor 40. The goose head shape conveyor 40 is connected to the first roller conveyor 31 of the waste roll web product processing system 30 and adapted for transferring waste roll web products 32 to the first roller conveyor 31.

The goose head shape conveyor 40 comprises a plurality of rollers 41, at least one conveyor belt 43 wound around the rollers 41 and a plurality of carriers 431 mounted on the at least one conveyor belt 43 and adapted for carrying waste roll web products 32. Further, the goose head shape conveyor 40 is divided into a first conveying zone 42 and a second conveying zone 44. Waste roll web products 32 are delivered through the first conveying zone 42 in horizontal, and then delivered obliquely upwardly toward the first roller conveyor 31 of the waste roll web product processing system 30 through the second conveying zone 44.

During application, waste roll web products 32 (waste head materials 23 and/or waste end materials 25) are placed in the first conveying zone 42 and carried by the at least one conveyor belt 43. When waste roll web products 32 are delivered into the second conveying zone 44, they are moved obliquely upward and forward. Thus, the waste roll web products 32 that are not carried in the carriers 431 will fall back to the first conveying zone 42, i.e., only the waste roll web products 32 that are carried in the carriers 431 will be delivered to the waste roll web product processing system 30. By means of the aforesaid conveying procedure, all the waste roll web products 32 will be delivered to the waste roll web product processing system 30 in good order.

Further, a screening device 45 may be provided at one side relative to the goose head shape conveyor 40, and adapted for screening the waste roll web products 32 being delivered by the goose head shape conveyor 40 to force the waste roll web products 32 that are not arranged in good order to fall from the second conveying zone 44 to the first conveying zone 43. For example, the screening device 45 can be a wheel brush rotatable to force the waste roll web products 32 that are not arranged in good order to fall from the second conveying zone 44 to the first conveying zone 43.

Figure 5:
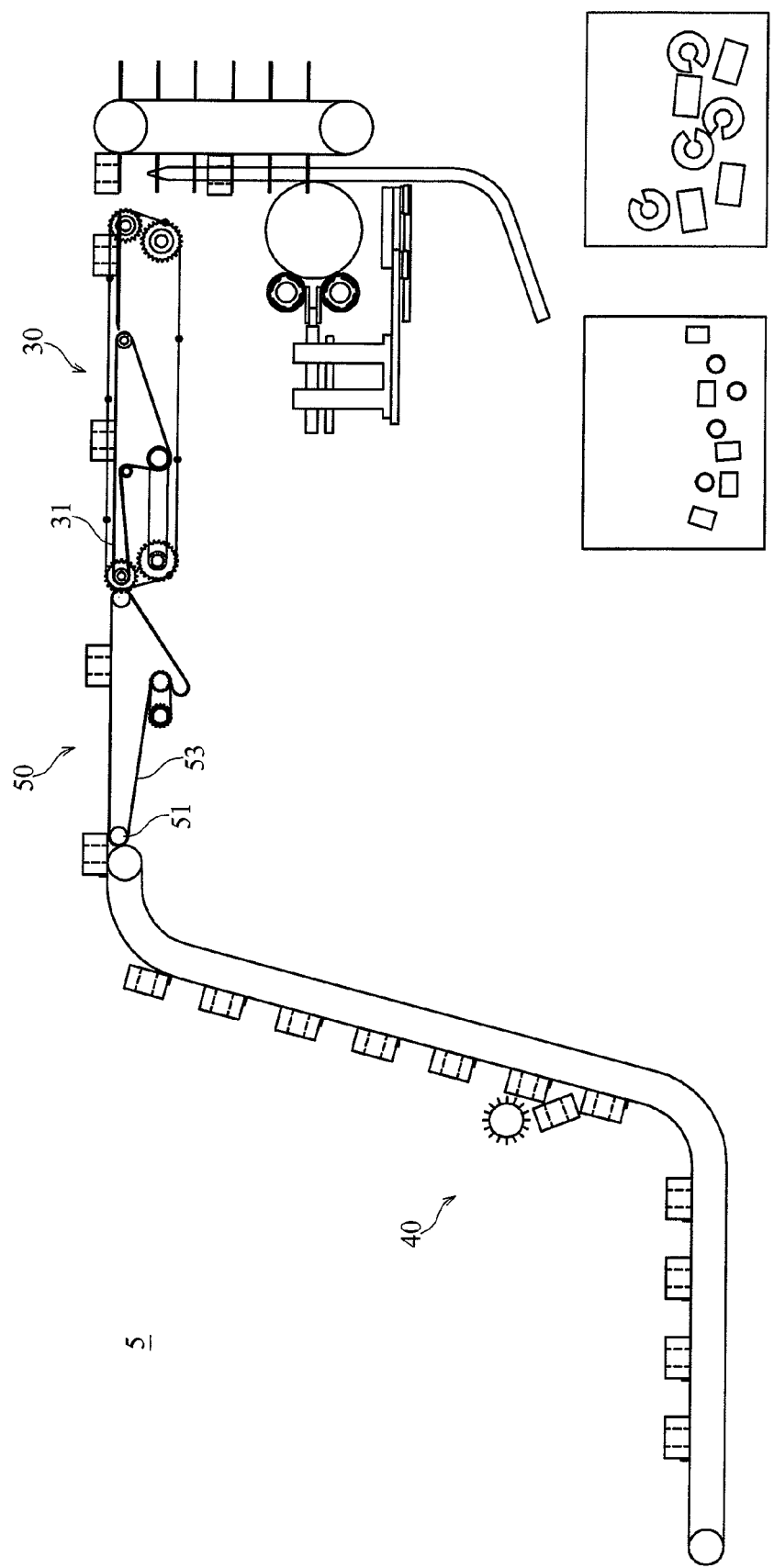
FIG. 5 is a schematic structural view of a waste roll web product processing system in accordance with a third embodiment of the present invention.

FIG. 5 illustrates a waste roll web product processing system in accordance with a third embodiment of the present invention. According to this third embodiment, the waste roll web product processing system 5 is a combination of the waste roll web product processing system 30, the goose head shape conveyor 40 and a supplementary conveyor 50. The supplementary conveyor 50 is set between the goose head shape conveyor 40 and the first roller conveyor 31 of the waste roll web product processing system 30, and adapted for transferring waste roll web products 32 from the goose head shape conveyor 40 to the first roller conveyor 31 of the waste roll web product processing system 30.

Figure 5A:
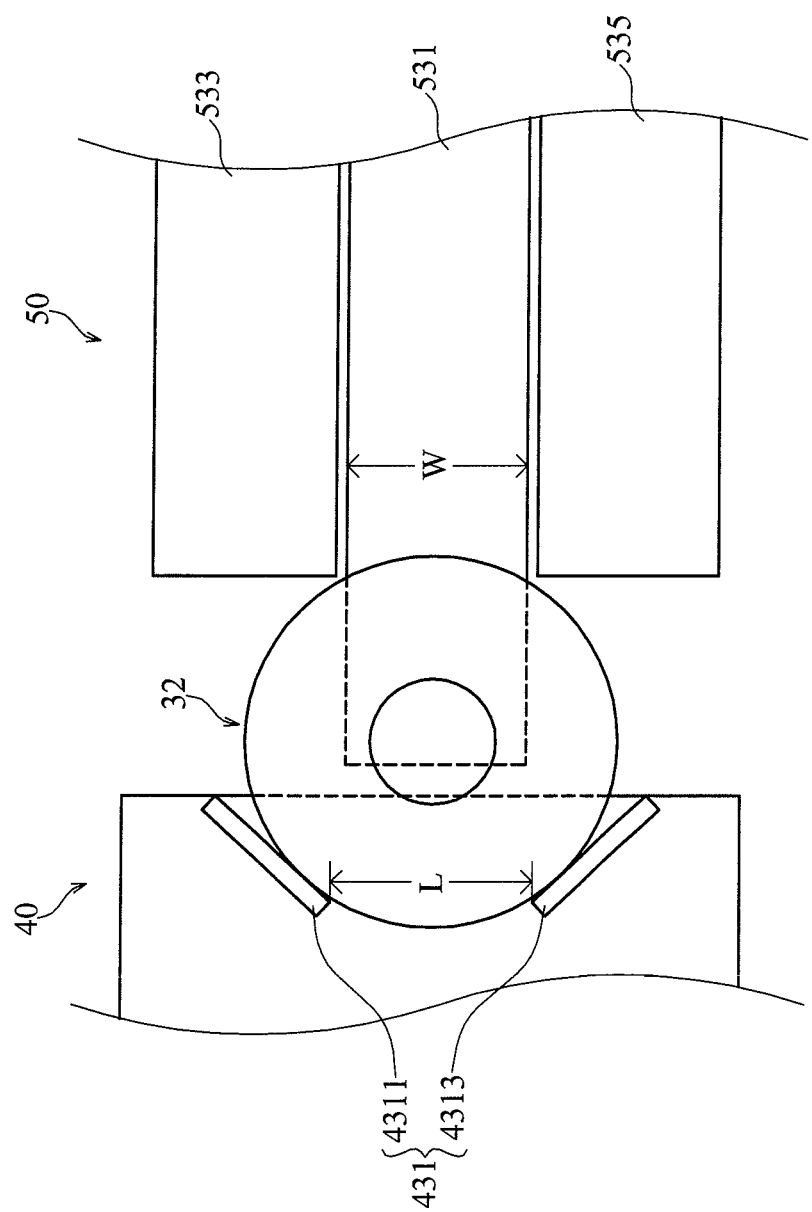
FIG. 5A is an enlarged view of a part of FIG. 5.

The supplementary conveyor 50, as shown in FIG. 5A, comprises a plurality of rollers 51, and at least one conveyor belt 53 wound around the rollers 51. The at least one conveyor belt 53 is rotatable by the rollers 51 to deliver waste roll web products 32. Preferably, the at least one conveyor belt 53 includes a first conveyor belt 531, a second conveyor belt 533 and a third conveyor belt 535. The first conveyor belt 531 is set between the second conveyor belt 533 and the third conveyor belt 535. Moreover, partial first conveyor belt 531 projects from the second conveyor belt 533 and the third conveyor belt 535, so that the first conveyor belt 531 can receive waste roll web products 32 from the goose head shape conveyor 40.

Further, as shown in FIG. 5A, each carrier 431 of the goose head shape conveyor 40 comprises a first bearing portion 4311 and a second bearing portion 4313. Further, the width W of the first conveyor belt 531 is smaller than the gap L between the first bearing portion 4311 and the second bearing portion 4313, presenting direct touch between the carriers 431 of the goose head shape conveyor 40 and the supplementary conveyor 50 during delivery of waste roll web products 32.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A waste roll web product processing system adapted for processing waste roll web products for recycling, comprising:
   a first roller conveyor having a first conveyor belt driven along a first portion of longitudinal path for conveying said waste roll web products to an intermediate position of said longitudinal path;
   a push bar conveyor having at least one push bar being concurrently driven with said first conveyor belt and in parallel therewith along said longitudinal path and displacing said waste roll web products from said intermediate position along a second portion of said longitudinal path;
   a second roller conveyor having a second conveyor belt driven along a path extending in a direction different from said longitudinal path and having at least one carrier mounted thereto for receiving said waste roll web products from said push bar conveyor at a terminus of said second portion of said longitudinal path;
   a guide device disposed adjacent to said second roller conveyor and receiving said waste roll web products from said second roller conveyor, said waste roll web products being sleeved on said guide device and guided during displacement thereof in a predetermined direction; and
   a cutter disposed adjacent to said guide device and adapted for cutting off said waste roll web products from said guide device.

2. The waste roll web product processing system as claimed in claim 1, wherein said push bar conveyor comprises a plurality of chain wheels, at least one chain mounted around said chain wheels, and said at least one push bar being fastened to said at least one chain and movable with said at least one chain to push said waste roll web products along said second portion of said longitudinal path toward said second roller conveyor.

3. The waste roll web product processing system as claimed in claim 1, wherein said path of said second conveyor belt of said second roller conveyor is perpendicular to said longitudinal path.

4. The waste roll web product processing system as claimed in claim 1, wherein each said waste roll web product comprises a shaft and a web material rolled up on said shaft.

5. The waste roll web product processing system as claimed in claim 4, wherein said cutter cuts the web material of each said waste roll web product to separate the web material of each said waste roll web product from a corresponding shaft thereof.

6. The waste roll web product processing system as claimed in claim 4, further comprising a first recycling bin positioned relative to said cutter for collecting the web material of each said waste roll web product and a second recycling bin positioned relative to said guide device for collecting the shaft of each said waste roll web product.

7. The waste roll web product processing system as claimed in claim 6, wherein said guide device is a guide rod member having a bottom end curving toward said second recycling bin.

8. The waste roll web product processing system as claimed in claim 1, wherein said cutter is a circular cutter rotatable to cut each said waste roll web product.

9. The waste roll web product processing system as claimed in claim 8, further comprising at least one cutter grinder disposed adjacent to said circular cutter for sharpening said circular cutter during rotation thereof.

10. The waste roll web product processing system as claimed in claim 1, further comprising a goose head shape conveyor positioned relative to said first roller conveyor to convey said waste roll web products thereto.

11. The waste roll web product processing system as claimed in claim 10, further comprising a supplementary conveyor set between said goose head shape conveyor and said first roller conveyor and adapted for conveying said waste roll web products from said goose head shape conveyor to said first roller conveyor.

12. The waste roll web product processing system as claimed in claim 11, wherein said supplementary conveyor comprises a first conveying belt, a second conveying belt and a third conveying belt driven along a longitudinal path in parallel side by side relationship, said first conveying belt being set between said second conveying belt and said third conveying belt; said goose head shape conveyor comprises a plurality of carriers mounted on a conveyor belt thereof for carrying said waste roll web products to said first conveying belt of said supplementary conveyor.

13. The waste roll web product processing system as claimed in claim 12, wherein each said carrier of said goose head shape conveyor comprises a first bearing portion and a second bearing portion spaced from said first bearing portion at a distance greater than the width of said first conveying belt of said supplementary conveyor.

14. The waste roll web product processing system as claimed in claim 10, further comprising a screening device set at one lateral side relative to said goose head shape conveyor and adapted for screening said waste roll web products for delivery to said first roller conveyor.

15. The waste roll web product processing system as claimed in claim 1, wherein said second conveyor belt of said second roller conveyor is driven vertically.

16. The waste roll web product processing system as claimed in claim 1, further comprising a conveying platform disposed adjacent to said first roller conveyor, said conveying platform defining said second portion of said longitudinal path.

17. The waste roll web product processing system as claimed in claim 16, wherein said at least one push bar of said push bar conveyor pushes said waste roll web products on said conveying platform.

\* \* \* \* \*